P. MUELLER & A. C. SCHUERMANN.
APPARATUS FOR ATTACHING COLLARS OR FLANGES TO PIPE FITTINGS.
APPLICATION FILED MAR. 28, 1911.
1,034,726.
Patented Aug. 6, 1912.
2 SHEETS—SHEET 1.
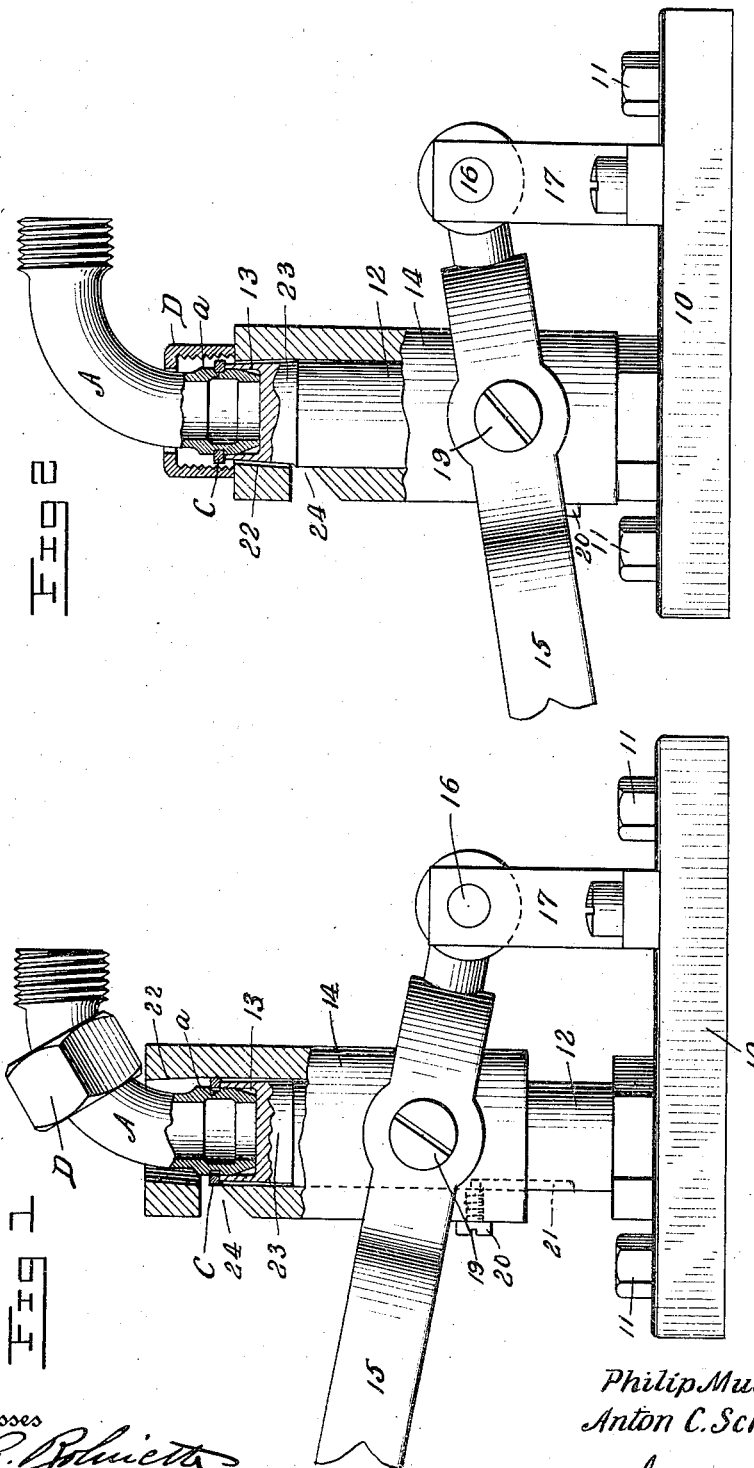
Witnesses
H. A. Polnetti
H. P. Hollingsworth
Inventors:
Philip Mueller
Anton C. Schuermann
By Meyers, Cushman & Rea
Attorney

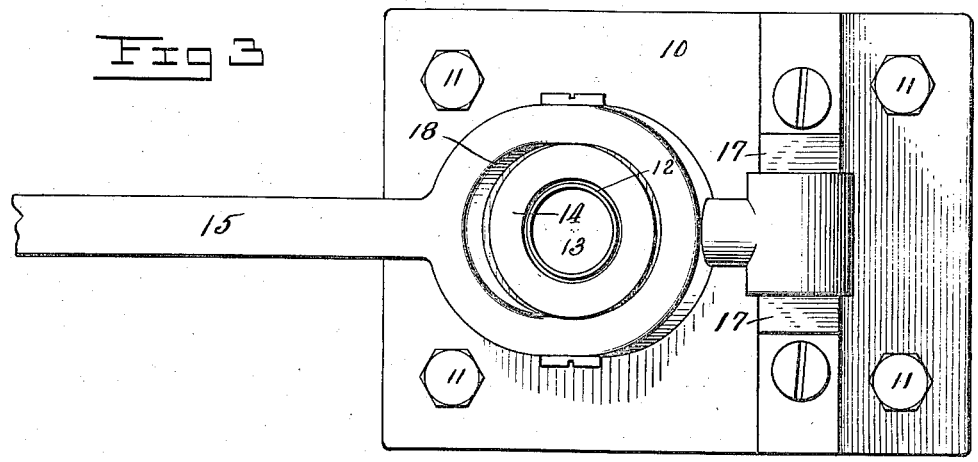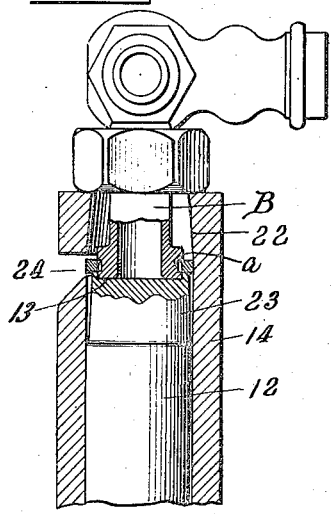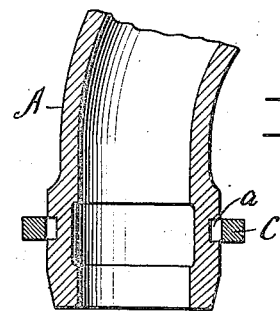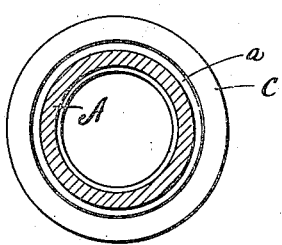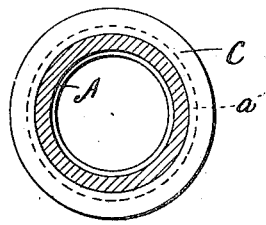

UNITED STATES PATENT OFFICE.

PHILIP MUELLER AND ANTON C. SCHUERMANN, OF DECATUR, ILLINOIS, ASSIGNORS TO H. MUELLER MANUFACTURING COMPANY, OF DECATUR, ILLINOIS, A CORPORATION OF ILLINOIS.

APPARATUS FOR ATTACHING COLLARS OR FLANGES TO PIPE-FITTINGS.

1,034,726.

Specification of Letters Patent.

Patented Aug. 6, 1912.

Application filed March 28, 1911. Serial No. 617,472.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Apparatus for Attaching Collars or Flanges to Pipe-Fittings, of which the following is a specification.

This invention relates to an apparatus for attaching or securing coupling nuts on union joints for use with pipes, faucets and other fittings.

The object of the invention is to apply to the outer end of the shank on which a coupling nut is carried and around which it may be freely rotated a collar formed by a preferably continuous ring, shrunken or compressed into a suitably prepared circumferential seat or groove in said shank, which collar projects beyond the peripheral surface of the shank sufficiently far to retain the coupling nut on said shank and serve as an abutment or shoulder for said coupling nut when the latter is screwed on a coöperating member for completing a connection.

In the accompanying drawings: Figure 1 is an elevation partly in section of a type of machine capable of carrying out the invention by longitudinal movement of the pressure means, the machine being shown in position at the beginning of applying a collar on a quarter coupling. Fig. 2 is a similar view of the machine and coupling at the completion of its operation, the collar being shown in position in its seat or groove. Fig. 3 is a plan view of the machine. Fig. 4 is a view like the upper portion of Fig. 1 showing the machine operating on a bath fitting or double cock, and Figs. 5, 6 and 7 are views showing the application of the ring to its seat or groove to form a retaining collar.

In the drawings wherein like reference characters are used for the same parts in all the figures 10 indicates a base plate of a convenient size and shape firmly attached by bolts 11 to a bench or other fixed support. Extending upwardly from the base plate is a standard 12 of any desired cross sectional shape, but here shown as cylindrical. This standard is secured to the base plate in the present instance by means of a threaded projection screwed into the plate, but any other means may be employed for holding it rigidly on the base plate. The standard 12 may be of any height most convenient for use and has formed in its upper end a socket 13 to receive the shank of the fitting on which a collar is to be placed. The socket 13 is of such depth that when a shank, such as A in Fig. 1 or B in Fig. 4 is inserted therein the top of the standard 12 will be in a plane with the lower side of the circumferential groove *a* in said shank.

Surrounding the standard 12 is a sleeve 14, longitudinally movable on said standard by means of a lever 15 pivoted at 16 on a bracket or bearing 17 fastened to the base plate 10 a short distance from the standard 12. The lever 15 is preferably formed with a hole 18 to receive the sleeve 14 and connected thereto by oppositely disposed pivot screws 19 as shown. A pin 20, which may be in the form of a screw, extends through the sleeve 14 and projects from its inner side into a vertical slot 21 cut in the side of the standard 12, the pin and slot serving both as a guide and as a stop for limiting the movement of the sleeve.

The bore of the sleeve 14 in the embodiment of the device shown, is cylindrical for the greater part of its length and fits snugly around the standard 12, but slides easily thereon. The upper end 22 of the bore, however, is, for a sufficient distance from the end, made conical or tapering inwardly and upwardly to act as a die on the ring or collar C and compress it into the groove *a* of the shank. The angle of inclination of the die 22 may vary within certain limits, depending on the length of movement of the sleeve 14 and the depth of the circumferential or annular groove *a* in which the collar C is seated. When the shank to receive the collar is short the movement of the sleeve is limited, thus necessitating a greater inclination of the walls of the die 22 than would be the case where a long movement of the sleeve is possible. The upper end of the standard 12 is slightly reduced in diameter as at 23 to give room for the die when the sleeve 14 is depressed as seen in Fig. 2. A slot 24 is made in one side of the sleeve 14 at such a point as to be in the plane of the top of the standard 12 when said sleeve is elevated to enable the rings or collars C being inserted within the sleeve and rest on the top of the standard, (see Figs. 1 and 4).

In the operation of the machine the sleeve 14 is raised by the lever 15 to the position indicated in Fig. 1, and a ring or collar C inserted through the slot 24 in the sleeve onto the top of the standard 12 where it rests. The shank of a fitting such as A or B or other type of fitting is then inserted through the upper end of the sleeve and the ring or collar C, which has an opening sufficiently large for the passage of the shank and into the socket 13, where it rests on the bottom of the same, the coupling nut D being first slipped on the stem. The depth of the socket 13 is such that the circumferential groove $a$ is exactly opposite the ring. The lever 15 is now depressed to move the sleeve 14 in a longitudinal direction, thus bringing the conical die 22 into contact with the exterior of the stationary ring on all sides. The movement gradually or progressively compresses or reduces the diameter of the ring and forces it into the groove $a$ in the shank. This compressing action continues until the die 22 has been depressed below the ring or collar as shown in Figs. 2 and 4, at which time the ring will be firmly seated in the groove and project a sufficient distance from the shank to engage the inturned flange $d$ on the coupling nut D. As the conical die 22 is circular in cross section it bears equally on all sides of the ring or collar while seating it in the groove $a$, so that at the completion of the operation the periphery of said collar is a true circle and concentric with the shank and the interior of the coupling nut.

From the above description, it is clear that the broad idea of seating rings by the aforesaid machine in grooved fittings consists in the progressive application of pressure to the exterior of said rings, particularly unbroken or continuous rings, the movement being in a direction longitudinally of or axially with the ring and fitting. The resultant of said pressure being such as to compress the ring radially on all sides and reduce its diameter. This result will be accomplished equally as well if the reducing means be fixed and the ring and fitting move, or if both the reducing means and the ring and fitting advance simultaneously toward each other.

The improved means of securing coupling nuts for union joints on fittings of various kinds is cheap, simple, rapid and very efficient. The grooves in the shanks can be formed, the rings or collars produced, and the parts assembled without the employment of skilled labor, the final result being a finished article of great strength and utility.

Claims:—

1. A machine for the purpose described comprising a supporting member for a ring provided with an opening to support a fitting formed with a groove to receive said ring, a sleeve member surrounding said support the bore of which is inwardly tapered at its outer end and a transverse slot formed in said sleeve at the base of the tapered portion, and means for longitudinally moving one of said members relatively to the other.

2. A machine for the purpose described comprising a supporting member for a ring provided with a socket to support a fitting formed with a groove to receive said ring, said supporting member being tapered at its ring supporting end, a sleeve member surrounding said support the bore of which is inwardly tapered correspondingly to the outer end of said supporting member, said sleeve member having a transverse slot formed therein at the base of the tapered portion, and means for longitudinally moving one of said members relatively to the other.

3. A machine for the purpose described comprising a fixed supporting member exteriorly tapered at its upper end to form a rest for a ring and having a socket at the same end to support an externally grooved fitting, a sleeve member surrounding said supporting member and adapted to move longitudinally thereof, said sleeve member having its upper end tapered correspondingly to the tapered end of the supporting member and provided with a transverse slot, the lower edge of which is adapted to be raised to the same plane as the top of the supporting member, means for preventing rotation of said sleeve, and means for longitudinally moving the same.

4. A machine for the purpose described comprising a fixed standard to support a ring and provided with a socket in its free end, a sleeve longitudinally movable on said standard formed with a conical die in its outer end and a slot in one side through which said rings are inserted to rest upon said standard, and means for operating said sleeve to cause said die to act on and compress said ring into an annular groove formed in the exterior of a fitting supported in the socketed end of said standard.

5. A machine for the purpose described comprising a fixed standard adapted to support a ring and provided with a socket in its free end for the reception of a fitting having an exterior annular groove, said supporting end being tapered, means to hold said fitting and ring in fixed position with the ring in line with said groove, a sleeve slidable on said standard and provided with a conical die for compressing said ring radially into said groove and provided with a lateral slot below the conical die portion through which slot said ring is passed to its supporting standard, and means for moving said die progressively over said ring in an axial direction and beyond the ring support to permit the removal of the fitting.

In testimony whereof we have hereunto set our hands in presence of two subscribing witnesses.

PHILIP MUELLER.
ANTON C. SCHUERMANN.

Witnesses:
LEONARD F. MCKIBBEN,
WILLIAM R. BIDDLE.